United States Patent [19]

McElvy

[11] Patent Number: 4,563,862

[45] Date of Patent: Jan. 14, 1986

[54] PACKAGE FORMING APPARATUS WITH COMBINED HOLDING AND STRIPPER MECHANISM

[75] Inventor: Howell T. McElvy, Decatur, Ga.

[73] Assignee: Kliklok Corporation, Greenwich, Conn.

[21] Appl. No.: 663,891

[22] Filed: Oct. 23, 1984

[51] Int. Cl.⁴ .................................................. B05B 9/08
[52] U.S. Cl. ............................................ 53/552; 53/511
[58] Field of Search ................ 53/433, 450, 451, 373, 53/511, 550, 551, 552, 554

[56] References Cited

U.S. PATENT DOCUMENTS

| | | | |
|---|---|---|---|
| 2,915,866 | 12/1959 | Bartlo | 53/526 |
| 2,916,864 | 12/1959 | Meissner | 53/550 |
| 3,027,695 | 4/1962 | Leasure | 53/451 |
| 3,684,254 | 8/1972 | Henry | 53/551 |

Primary Examiner—James F. Coan
Attorney, Agent, or Firm—King, Liles & Schickli

[57] ABSTRACT

A combined holding and stripper jaw apparatus is provided for use in a form, fill and seal packaging machine. The apparatus includes a pair of opposed holding jaws operated in reciprocating fashion to close and grasp the packaging film tube following the product filling step of the cycle. A stripper jaw is pivotally mounted to the underside of each holding jaw. The stripper jaws are each movable between a ready position adjacent the holding jaws and a strip position for stripping the product in the packaging film tube. Sealing jaws independently mounted between the holding and stripping jaws are separately cycled to close and seal the packaging film into a bag. As the sealing jaws close, a cam surface on the sealing jaws contacts an angled portion of the stripper jaws forcing the stripper jaws downward against spring tension to the strip position. In addition, the holding and stripper jaws include relief features in the edges contacting the packaging film for the venting of trapped air.

12 Claims, 11 Drawing Figures

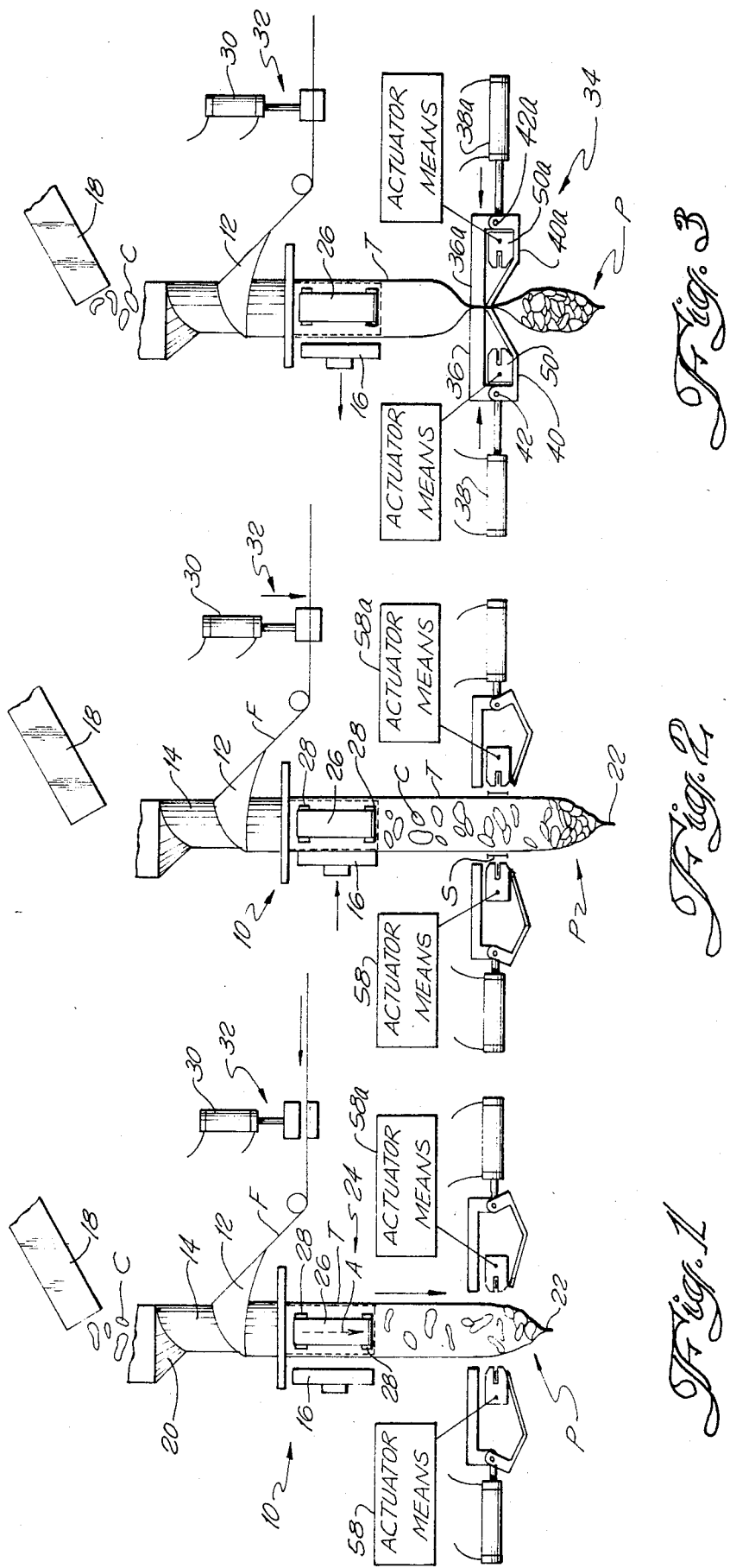

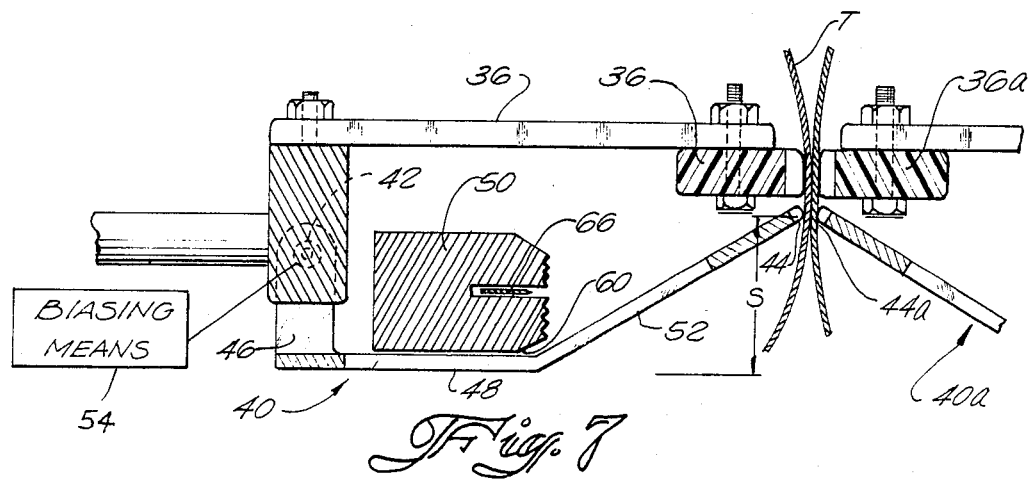
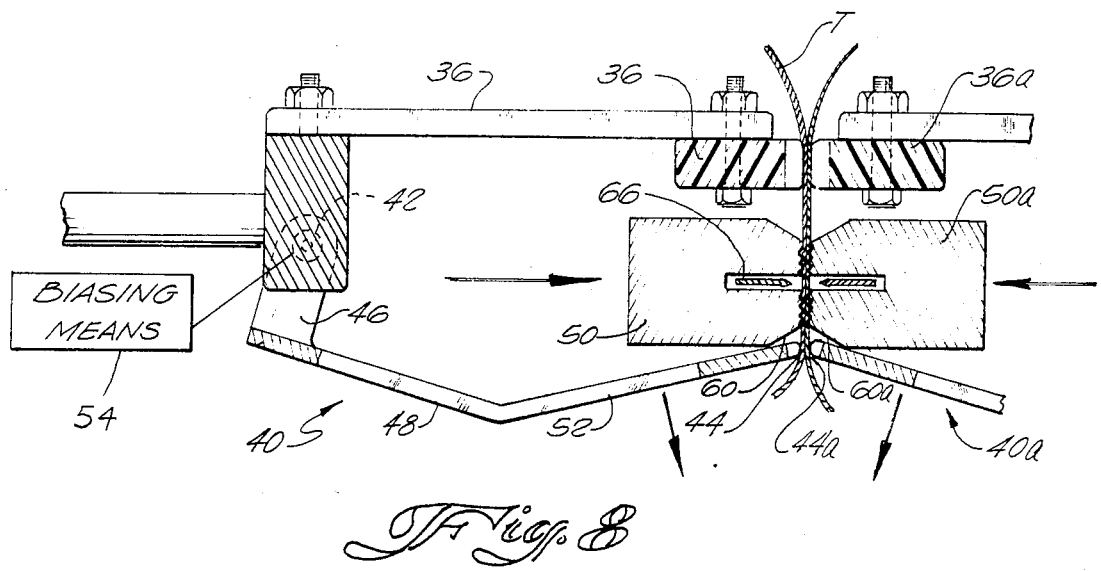
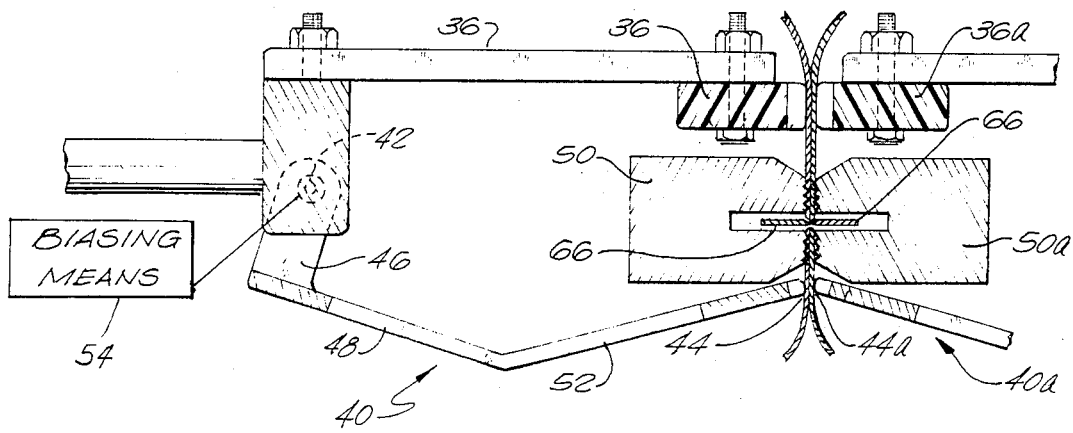

PACKAGE FORMING APPARATUS WITH COMBINED HOLDING AND STRIPPER MECHANISM

TECHNICAL FIELD

The present invention relates generally to the packaging field and, more particularly, to the combination of product holding jaws and stripper jaws for use in providing efficient filling and forming of a package in a form, fill and seal packaging machine.

BACKGROUND ART

Machines for the forming, filling and sealing of packages made from a continuous web or film of material are well known in the art. The machines comprise a supply of packaging film, a former and edge sealer for forming the film into a continuous hollow tube and reciprocating sealing and cutting jaws for sealing and cutting the tube into a consecutive series of filled packages. The machines have become increasingly popular in the packaging field due to their simplicity and speed of operation. Difficulties arise, however, when the machines are used to package bulky, lightweight materials, such as potato chips, that bunch and bridge so as to resist settling by gravity alone.

Initially in the art this problem was addressed simply by providing a length of packaging film sufficient to hold the greatest volume that the desired weight of product could assume. Such packaging is unsatisfactory, however, since the product settles during subsequent handling. The settling results in packages having the undesirable appearance of being improperly filled even when containing the proper net weight of product. Disadvantageously, the partially filled appearance of the packages promotes a negative consumer reaction adversely affecting product sales. A further concern to the manufacturer is the required additional packaging film needed for each package of a longer length. The use of this additional packaging film adds substantially to the costs to the manufacturer.

Recognizing these shortcomings, two separate approaches have developed in the art for solving this problem. The first approach involves the provision of vibrating clamps to the packaging machine. As shown in U.S. Pat. No. 3,684,254 to Henry, owned by the assignee of the present invention, the vibrating clamps are closed to engage the packaging film following the product filling cycle. The vibratory motion of the clamps is then imparted to the packaging film to settle the product in the package.

The second approach, which can be used separately or in conjunction with the first, involves the provision of stripper jaws to the packaging machine. The stripper jaws function to mechanically force or strip the product in the packaging film down into the package being formed. As shown in U.S. Pat. Nos. 2,915,866 to Bartlo and 3,027,695 to Leasure, opposing stripper jaws mounted on the sealing jaws are moved into contacting engagement around the packaging film so as to flatten the walls of the packaging film tube together. The stripper jaws or the packaging film is then moved relative to the sealing jaws of the packaging machine so that the product is stripped downward. This provides a packaging film sealing zone free of product adjacent the sealing jaws. The sealing jaws are then brought into engagement across the film to seal the film containing the settled product into a package.

The Bartlo stripper jaws are specifically adapted to be mounted directly above the sealing jaws of the packaging machine. Consequently, there is no provision for product holding jaws. Further, even if holding jaws were provided, they could not possibly be positioned adjacent the sealing jaws due to the positioning of the stripper jaws above the sealing jaws. Without holding jaws positioned adjacent the stripper jaws, the speed of a packaging operation is limited as filling of the next package cannot take place until the stripping and sealing of the present package is completed.

In addition, there is no provision for vents in the Bartlo stripper rods to allow the passage of air from the bag during stripping action. Therefore, as the bag is stripped, air pressure builds in the bag, possibly resulting in the longitudinal or bottom sealed edges of the bag bursting.

The combined sealing and stripper jaw assembly of Bartlo is of excessive overall height increasing the overall packaging machine height requirements. Proper stripping operation of the Bartlo mechanism requires the sealing jaws to travel over a longer path during each packaging machine cycle. This is due to the mounting of the stripper jaws so as to extend inwardly from the sealing jaws toward the packaging film. This additional path length for proper operation further reduces overall packaging machine speed and efficiency. In addition, the excessive weight of the reciprocating Bartlo stripper/sealing jaws adversely affects the smooth operation of the packaging machine.

In Leasure, stripper plates are brought together in operative position so as to engage the packaging film. The reciprocating former then pulls the film upward in reverse direction through the stripper plates. The stripper plates serve to flatten the film and force any product down into the package to provide a clear sealing area.

The requirement of a reciprocating former as in Leasure greatly reduces packaging machine speed of operation, smoothness and efficiency. In addition, the stripper plates of Leasure are shown spaced at all times below the sealing jaws. This leads to a waste of packaging film. That is, the packaging film provided between the stripper plates and the sealing jaws in each bag is not stripped so that each stripping cycle must start higher than would otherwise be required. Elimination of this waste packaging material in each package (approximately ⅜" on an average size bag) produced by just one packaging machine during a single day or operation leads to a large savings in manufacturing costs.

From the above, it is clear that a need exists for an improved mechanism for stripping bulky, lightweight product from the packaging film sealing zone in a form, fill and seal packaging machine.

DISCLOSURE OF THE INVENTION

Accordingly, it is a primary object of the present invention to provide an improved apparatus or mechanism for settling a bulky, lightweight product in a form, fill and seal packaging machine overcoming the above-described limitations and disadvantages of the prior art.

Another object of the invention is to provide an improved apparatus of simplified mechanical structure and small size for settling bulky, lightweight material in a packaging film tube prior to the sealing of the tube into a package.

Still another object of the invention is to provide an improved apparatus for settling lightweight, bulky material in a packaging film tube, including holding jaws, stripping jaws and sealing jaws therebetween to provide improved overall stripping and packaging efficiency.

A further object of the invention is to provide a stripper jaw apparatus for attachment to a form, fill and seal packaging machine providing more effective stripping action, overall improved packaging efficiency and cost savings through the elimination of packaging film waste.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a cam operated stripper jaw apparatus is provided for use in forming a package in a form, fill and seal packaging machine. The apparatus includes means for holding the packaging film, such as a pair of opposed holding jaws. The holding jaws engage to close the packaging film tube above and immediately adjacent opposed sealing jaws, thereby allowing the filling of the tube for the next package as the present package is being stripped, sealed and cut from the tube. A stripper jaw is mounted to each holding jaw for movement between a ready position with the operative end of the stripper jaw adjacent the holding jaw, and a strip position just below the sealing jaw and at the top of the formed and filled package. During movement from the ready to the strip position, the stripper jaws strip and settle the product previously delivered into the packaging film tube from the sealing zone of the film. This allows the proper sealing of a package having a full and aesthetically pleasing appearance and using a minimum amount of packaging film.

Each sealing jaw includes an angled cam surface along the leading, bottom edge that contacts and moves the stripper jaws into the strip position as the sealing jaws are moved to close and seal the packaging film tube and form a package. Thus, the stripping action is fully synchronized with the inward movement of the sealing jaws.

Preferably, the stripper jaws are biased as, for example, by means of a coil spring toward the ready position. The stripper jaws include a connecting portion for pivotally mounting the stripper jaws to the holding jaws, an extension portion extending in a plane substantially parallel to the path of movement of the sealing jaws and an angled portion extending across the path of movement of the sealing jaws toward the holding jaws. The angled surface along the leading bottom edge of the sealing jaws forms a cam that contacts the angled portion of the stripper jaws to pivot the jaws between the ready and strip positions. Of course, actuator means such as pneumatic cylinders are provided for independently moving the holding and sealing jaws in a reciprocating manner.

In addition, the holding and stripping jaws both include means for venting air from the formed package to prevent the seams of the package from bursting during stripping action. The holding jaws may include spaced, matched oval reliefs for the passage of air from the formed bag. The mating edges between the reliefs contact and securely hold the packaging film closed along a straight line. In contrast, the stripper jaws may include unmatched scalloped edges that allow the sides of the packaging film to fully touch along a wavy line for effective stripping action while still allowing the passage of air from the bag. The unmatched scalloped edges provide greater stripping action by eliminating the need for a clearance dimension between the stripper jaws for venting air as provided in the prior art.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the apparatus and the principles of the invention. In the drawing:

FIG. 1 is a schematic representation of a form, fill and seal packaging apparatus utilizing the combined holding and stripper jaw apparatus of the present invention and showing a new length of tube being pulled and dropped into position for forming a new package;

FIG. 2 is a schematic representation of the packaging apparatus of FIG. 1 showing stopping the feed of the film, sealing the longitudinal seam of the tube and completing the filling of the package;

FIG. 3 is a subsequent schematic representation showing the closing of the holding jaws to engage the tube of packaging film above the new package and the beginning of the filling of the next package;

FIG. 7 is a detailed, broken-away cross-sectional view of the combined holding and stripper jaw apparatus of the present invention showing the holding jaws immediately after closing to engage the packaging film;

FIG. 8 is a cross-sectional view similar to FIG. 7 showing the pivoting of the stripper jaws of the apparatus of the present invention to provide stripping action to the film tube as the sealing jaws are closed to seal the packaging film tube into a package.

FIG. 9 is an additional detailed, broken-away cross-sectional view showing the cutting of the packaging film from the tube and the completion of the package;

Figure 6:
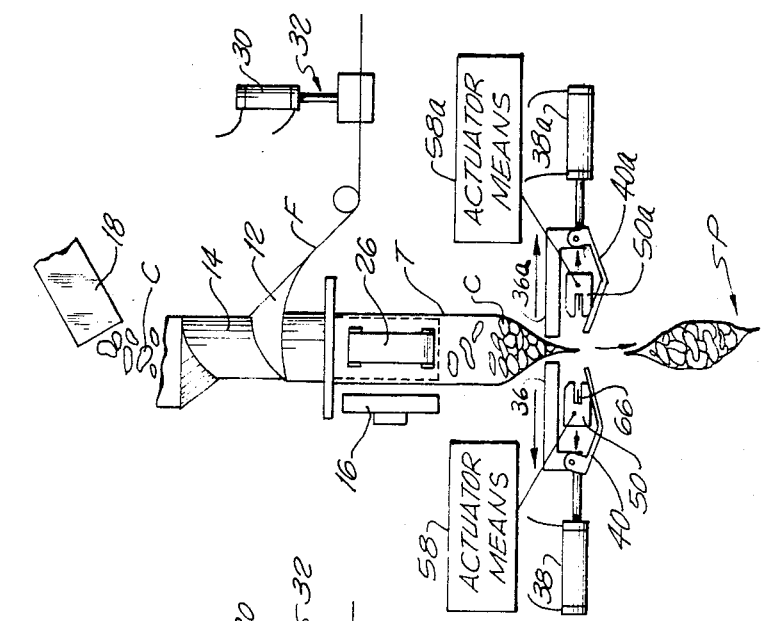
FIG. 6 is an additional schematic representation showing the opening of both the holding and sealing jaws of the apparatus of the present invention and the completed package cut from the tube of packaging film.

Reference will now be made in detail to the present preferred embodiment of the invention, an example of which is illustrated in the accompanying drawing.

DETAILED DESCRIPTION OF THE INVENTION

Reference is now made to FIG. 1 showing in schematic form a packaging apparatus 10 of the form, fill and seal type. The packaging film is fed from a supply roll (not shown) and is moved over a former 12 to form a continuous tube T. Longitudinal margins or edges of the film F come together in overlapping relation in the area of the former 12 around a hollow mandrel 14. A heated sealing shoe 16 operates in a manner well known in the art to seal the longitudinal margins or edges of the film F and for the tube T.

The packaging apparatus 10 also includes a feed chute 18 for delivering bulk material or product, such as potato chips C, into the funnel-shaped top 20 of the mandrel 14. A measured quantity of chips are released from a scale (not shown) and travel by gravity down the chute 18 and mandrel 14 into the open ended tube T of packaging film. The chips fall by gravity into the bottom of the tube T where a package P is being formed just above the transverse seal 22.

Film advancing means 24 comprise a pair of belts 26, each extending over a pair of spaced rollers 28. Only one belt 26 is shown in the figures with the other belt being positioned on the opposite side of the mandrel 14. Drive means (not shown) rotatably drive at least one of the rolls 28 of each belt 26 to move the belts 26 and advance the packaging film F over the former 12 (in the direction of arrow A of FIG. 1) to the position shown in FIG. 2. Drive to the rollers 28 and belts 26 is interrupted as cylinder 30 of film brake 32 is actuated to engage the film F and prevent further advance of the film so as to maintain the desired package P length. Of course, feeding of potato chips C to the package P is interrupted when the desired weight of product for the package is dispensed.

As shown in FIG. 3, a combined holding and stripper jaw apparatus 34 of the present invention is then actuated. The holding/stripper apparatus 34 includes a pair of opposed holding jaws 36 and 36a. Power cylinders, such as pneumatic cylinders 38 and 38a, are provided to move the holding jaws 36 and 36a, respectively, between an open position away from the packaging film (as shown in FIG. 2) and a closed position for engaging the packaging film (as shown in FIG. 3).

The holding/stripper apparatus 34 also includes a pair of stripper jaws 40 and 40a. Stripper jaw 40 is pivotally mounted to holding jaw 36 by means of stub shafts 42. Similarly, stripper jaw 40a is pivotally mounted to holding jaw 36a by means of stub shafts 42a. This mounting allows the stripper jaws to move between a ready position wherein the operative stripping edges 44, 44a of the stripper jaws are adjacent to the respective holding jaws 36, 36a (note FIGS. 3 and 7), and a strip position wherein the stripper jaws 40, 40a are pivoted with the stripping edges 44, 44a together and away from the holding jaws 36, 36a at the top of the package P (see FIGS. 4 and 8).

As shown in detail in FIGS. 7, 8 and 9, each stripper jaw 40 includes a connecting portion 46 that receives the stub shafts 42 (only one shown) for pivotally mounting the stripper jaw to the holding jaw 36. The stripper jaw 40 also includes an extension portion 48. As shown, the portion 48 extends in a plane substantially parallel to the path of movement of sealing jaws 50, the operation of which will be discussed below. Lastly stripper jaw 40 also includes an angled portion 52. Angled portion 52 extends across the path of movement of the sealing jaw 50 from the extension portion 48 toward the holding jaw 36. As should be appreciated, the mass of the jaw is very small providing for extremely smooth and low energy operation. Also, advantageously the angle between the extension portion 48 and angled portion 52 may be varied to adjust the stripping and sealing zone S along the film tube T (see FIGS. 2 and 7) to best suit the particular package type and size being formed.

Biasing means 54 is provided for biasing the stripper jaw 40 toward the ready position with the stripping edge 44 adjacent the holding jaw 36 and the angled portion 52 of the stripper jaw extending across the path of movement of the sealing jaw 50. The biasing means 54 may comprise a stiff coil spring (not shown in detail) wrapped around and connected to the stub shafts 42. Of course, any means known in the art capable of biasing the stripper jaw 40 to the ready position may be utilized with the invention.

It should also be recognized that stripper jaw 40a is a substantially identical mirror image structure of stripper jaw 40. Any detailed showing or description of the structure or stripper jaw 40a would be duplicative in nature and is, therefore, eliminated for purposes of clarity and simplicity.

Following the complete filling of the package P, as shown in FIG. 2, the holding/stripping apparatus of the present invention 34 is activated. First, pneumatic cylinders 38 and 38a operate to close holding jaws 36 and 36a, respectively, about the film tube T. During this closing action, biasing means 54 pivots the stripper jaws 40, 40a upwardly from the position shown in FIG. 2 to the ready position shown in FIGS. 3 and 7, wherein the operative stripping edges 44, 44a of the stripper jaws are contacting the film tube T adjacent the holding jaws (also see FIG. 7).

Figure 5:
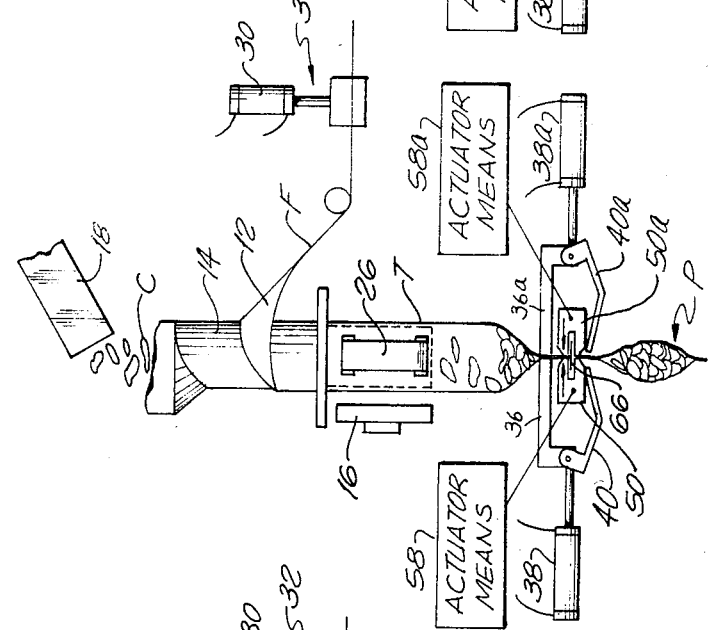
FIG. 5 is a schematic representation similar to FIG. 4 showing the cutting of the sealed package from the tube of packaging film and the continuing filling of the next package.
Figure 4:
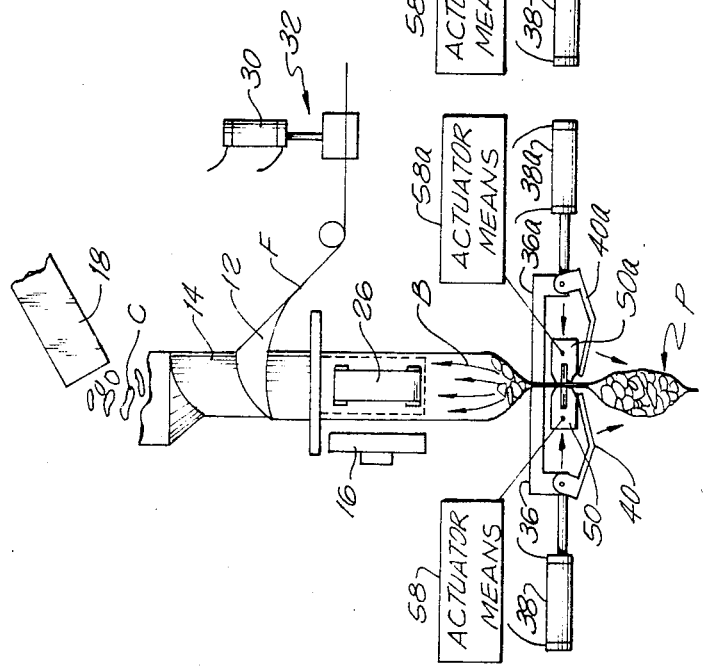
FIG. 4 is the next schematic representation illustrating the actuation of the stripper jaws for stripping action to the package during closing of the sealing jaws.
Figure 10:
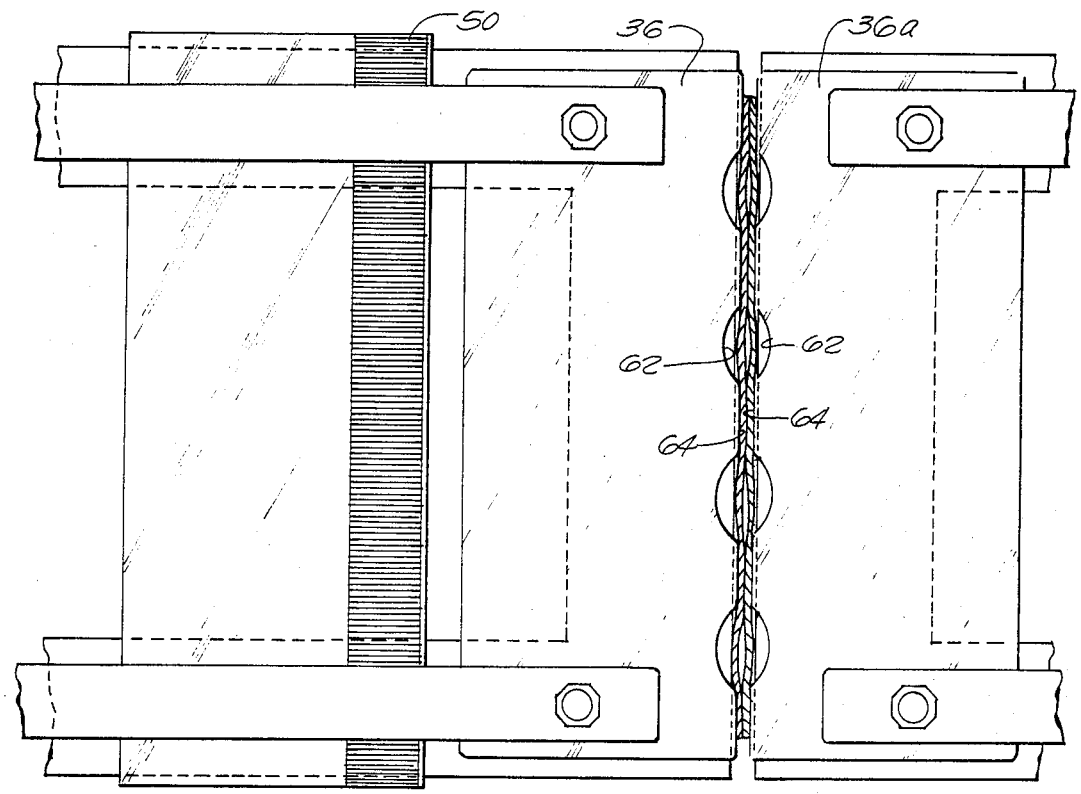
FIG. 10 is a detailed, broken-away top plan view of the holding jaws of the present invention in the closed position engaging the packaging film showing the matched edges and oval reliefs for allowing the venting of air from the package.

As should be appreciated, the film tube T is unrestricted above the holding jaws 36, 36a. Thus, immediately upon the closing of the holding jaws 36, 36a potato chips C may be dispensed from chute 18 into the tube T to begin filling the next package. It should, therefore, be seen that the holding/stripper apparatus 34 of the present invention provides a greater packaging efficiency unavailable with prior art devices, such as disclosed in Bartlo. In Bartlo, no holding jaws are provided and the blocks for mounting the stripper jaws tend to restrict the film tube well above the sealing jaws. This disadvantage is clearly avoided in the present invention. As shown in FIGS. 3-5, the film tube T above the closed holding jaws 36, 36a is free to expand and receive the chips from the chute 18.

Following the closing of the holding jaws 36, 36a, the opposed and cooperating sealing jaws 50, 50a are closed by actuator means 58, 58a (see FIGS. 4 and 6). The actuator means 58, 58a may be pneumatic cylinders such as used to actuate the holding jaws 36, 36a. During closing of the sealing jaws 50, 50a, angled or cam surfaces 60, 60a extending along the lower leading edge of the sealing jaws 50, 50a (see FIG. 8) contact the angled portion 52 of the adjacent stripper jaws 40, 40a. This contact serves to cam and pivot the stripper jaws 40, 40a about respective stub shafts 42, 42a against the biasing means 54 so that the stripping edges 44, 44a move downwardly together. The resulting downward stripping action serves to remove chips C from the stripping-/sealing zone S of the film tube T in the path of the closing jaws 50, 50a, thereby allowing sealing of the tube into a package P.

Figure 11:
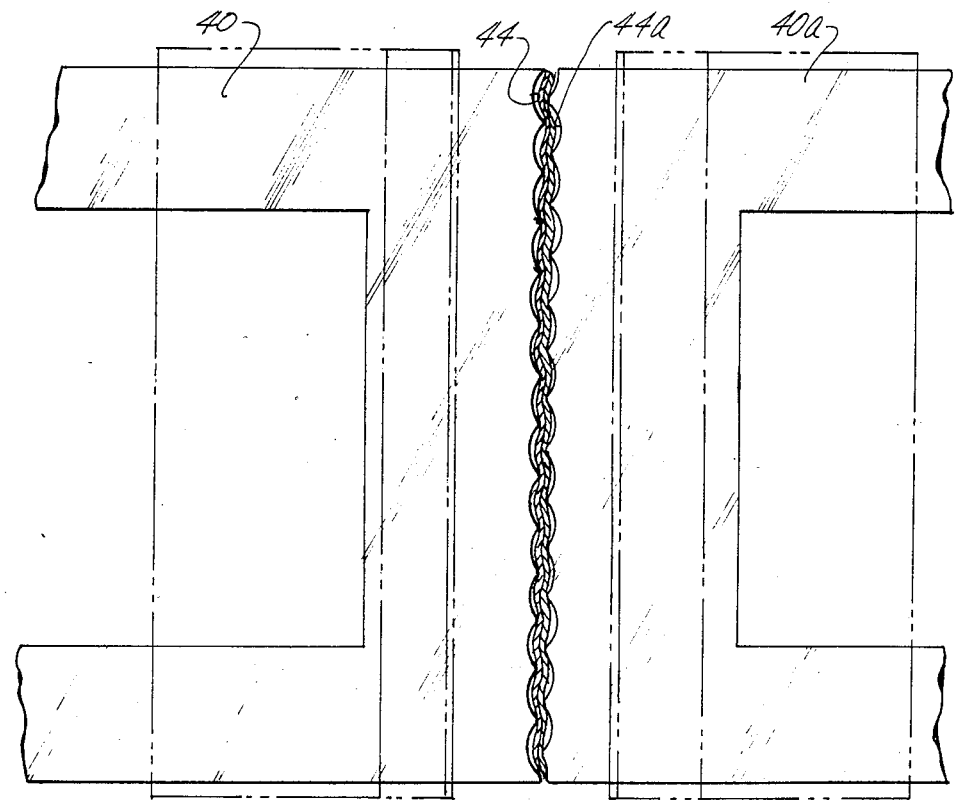
FIG. 11 is a detailed, broken-away top plan view of the stripper jaws of the present invention showing the unmatched scalloped edges providing efficient and effective stripping action while allowing the venting of air from the package being formed.

During the stripping action air is vented from the package P through unmatched scalloped edges 44, 44a of the stripper jaws 40, 40a as shown in FIG. 11. The unmatched scalloped edges 44, 44a allow the sides of the film tube T to touch at spaced intervals forming a wavy line for maximum stripping efficiency, i.e. there is no full width clearance dimension between the jaws while at the same time allowing trapped air to escape. The air from the package P also passes through matched oval reliefs 62 in the holding jaws 36, 36a (note arrows B in FIG. 4 showing the passage of air). Matched edges 64 between the matched oval reliefs 62 of the holding jaws 36, 36a allow the packaging film tube T to be securely closed and held in place during stripping, sealing and cutting of the package P. This allows the filling of the tube T above the holding jaws 36, 36a with chips C (note FIGS. 3-5).

Upon the full closing of the sealing jaws 50, 50a to engage the film tube T, stripping action is simultaneously carried out and a transverse seal is formed to effectively seal the package P. As should be appreciated, the transverse seal 22 is formed immediately adjacent to the stripper jaws 40, 40a with no wasted packaging film material therebetween, as required in the prior art Leasure reference. Thus, a minimum amount of packaging film F is used per package P so as to provide the manufacturer with substantial cost savings. Approximately ¼ to ¾ inch (⅜ inch average) of packaging film F, depending on the size of the package, can be saved by using the concepts of the invention.

Immediately after the sealing of the package P with the sealing jaws 50, 50a blades 66 are actuated to cut the completed package P from the packaging film tube T (see FIGS. 5 and 9). Following the cutting of the package P from the tube T, pneumatic cylinders 38, 38a and actuator means 56, 56a are activated to open the holding jaws 36, 36a and sealing jaws 50, 50a respectively (see FIG. 6). As this is done, the completed package P drops from the film tube T; for example, to an underlying conveyor (not shown) for further processing. The packaging film F is then advanced as shown in FIG. 1 for the initiation of the next packaging cycle.

In summary, numerous benefits and advantages have been described that result from employing the concepts of the present invention. The holding/stripper apparatus 34 of the present invention provides an uncomplicated the reliable system providing efficient and effective stripping action of product in a form, fill and seal packaging machine with a minimum overall quantity of mechanical and moving parts. Thus, the system provides stripping and sealing jaws of a lower mass. The reduced moveable mass provides a packaging machine of smoother operation. Additionally, there is no restriction of the packaging film tube T above the holding jaws 36, 36a in the apparatus of the present invention. Thus, the tube T is free to expand and be filled with chips C for cutting into a package during the next operating cycle as the package P is stripped, sealed and cut from the film tube T. Therefore, the machine of the present invention provides for a greater overall efficiency in packaging.

The integrity of the formed package P is also maintained more effectively than with prior art stripping devices. In particular, seal failure resulting from the pressurizing of the package P with stripping action is avoided. Specifically, the air in the package is vented through unmatched scalloped edges 44, 44a in the stripping jaws 40, 40a and matched oval reliefs 62 in the holding jaws 36, 36a. Further, a minimum amount of packaging film F is used in each package P as the sealing of the film tube T into a package occurs adjacent to and directly above the stripper jaws 40, 40a.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A combined holding and stripper jaw apparatus for use in forming a package in a form, fill and seal packaging machine or the like, comprising:
    (a) positive holding jaw means operative to close and grasp the packaging film formed into a tube;
    (b) stripper jaw means mounted to said holding jaw means for movement between a ready position adjacent said holding jaw means and a strip position at the top of the package for stripping product previously delivered into the packaging film tube; and
    (c) sealing jaw means positioned between said holding and stripping jaw means, said sealing jaw means including cam means for contacting and moving said stripper jaw means into the strip position as said sealing jaw means are moved in a path to close and seal the packaging film tube and form a bag, whereby stripping occurs during inward movement of the sealing jaws and a minimum length of packaging film is required for each package.

2. The holding/stripper apparatus set forth in claim 1, wherein means are provided for biasing said stripper jaw means toward the ready position.

3. The holding/stripper apparatus set forth in claim 1, wherein said stripper jaw means includes a connecting portion for pivotally mounting said stripper jaw means to said holding jaw means, an extension portion extending in a plane substantially parallel to the path of movement of the sealing jaw means, and an angled portion extending across the path of movement of said sealing jaw means toward said holding jaw means.

4. The holding/stripper apparatus set forth in claim 3, wherein said cam means includes an angled surface along a leading, bottom edge of said sealing jaw means for contacting said angled portion of said stripper jaw means.

5. The holding/stripper apparatus set forth in claim 1, wherein a first actuator means is provided for moving said holding jaw means and a second actuator means for said sealing jaw means to independently move the same between an open position away from the packaging film and a closed position contacting the packaging film.

6. The holding/stripper apparatus set forth in claim 5, wherein said actuator means include pneumatic cylinders.

7. The holding/stripper apparatus set forth in claim 1, wherein the operative edges of said holding jaw and stripper jaw means contacting the packaging film include means for venting air from the packaging film tube.

8. The holding/stripper apparatus set forth in claim 7, wherein said holding jaw means includes a pair of cooperating, opposed holding jaws and said stripper jaw means includes a pair of cooperating, opposed stripper jaws.

9. The holding/stripper apparatus set forth in claim 8, wherein said air venting means in said holding jaws includes matched oval reliefs in adjacent edges of the opposed holding jaws contacting the packaging film.

10. The holding/stripper apparatus set forth in claim 8, wherein said air venting means in said stripper jaws includes unmatched scallop edges of the opposed stripper jaws contacting the packaging film.

11. The holding/stripper jaw apparatus set forth in claim 1, wherein said holding jaw means are stationary to positively hold the packaging film as said stripper jaw means are moved to strip product by the closing of said sealing jaw means.

12. The holding/stripper jaw apparatus set forth in claim 11, wherein said stripper jaw means strip product from adjacent said holding jaw means across an entire area of the package to be sealed.

* * * * *